United States Patent
Burshan et al.

(10) Patent No.: US 12,425,439 B2
(45) Date of Patent: Sep. 23, 2025

(54) METHODS AND SYSTEMS FOR THREAT EVALUATION BASED ON ANTICIPATED PATHWAYS OF MALICIOUS ACTORS

(71) Applicant: Skyhawk Security, Ramat Gan (IL)

(72) Inventors: Chen Burshan, Omer (IL); Amir Shachar, Ramat Gan (IL)

(73) Assignee: SKYHAWK SECURITY, Ramat Gan (IL)

( * ) Notice: Subject to any disclaimer, the term of this patent is extended or adjusted under 35 U.S.C. 154(b) by 254 days.

(21) Appl. No.: 18/219,754

(22) Filed: Jul. 10, 2023

(65) Prior Publication Data
US 2025/0023899 A1    Jan. 16, 2025

(51) Int. Cl.
*H04L 29/06*   (2006.01)
*H04L 9/40*   (2022.01)

(52) U.S. Cl.
CPC ........ *H04L 63/1433* (2013.01); *H04L 63/145* (2013.01)

(58) Field of Classification Search
CPC .......................... H04L 63/1433; H04L 63/145
See application file for complete search history.

(56) References Cited

U.S. PATENT DOCUMENTS

| 2022/0060497 A1* | 2/2022 | Crabtree | G06N 20/00 |
| 2023/0396641 A1* | 12/2023 | Hebbagodi | H04L 63/1408 |
| 2024/0161108 A1* | 5/2024 | Madisetti | H04L 9/3213 |

* cited by examiner

*Primary Examiner* — Jeffrey C Pwu
*Assistant Examiner* — Thong P Truong
(74) *Attorney, Agent, or Firm* — Rivka Friedman

(57) ABSTRACT

Computerized methods and systems evaluate threats in a cloud environment having a plurality of assets. For each pair of one or more pairs of the assets, one or more identified paths from a first asset of the pair to a second asset of the pair is obtained. A sequence of assets that includes the first and second assets defines each path of the one or more identified paths. For each path of the one or more identified paths, a likelihood that an attacker that is at the first asset will successfully reach the second asset via the path is determined. In certain embodiments, for each pair of the one or more pairs a risk score for the pair is determined based on the determined likelihoods for the one or more identified paths. The risk score is indicative of risk the attacker will reach the second asset from the first asset.

19 Claims, 4 Drawing Sheets

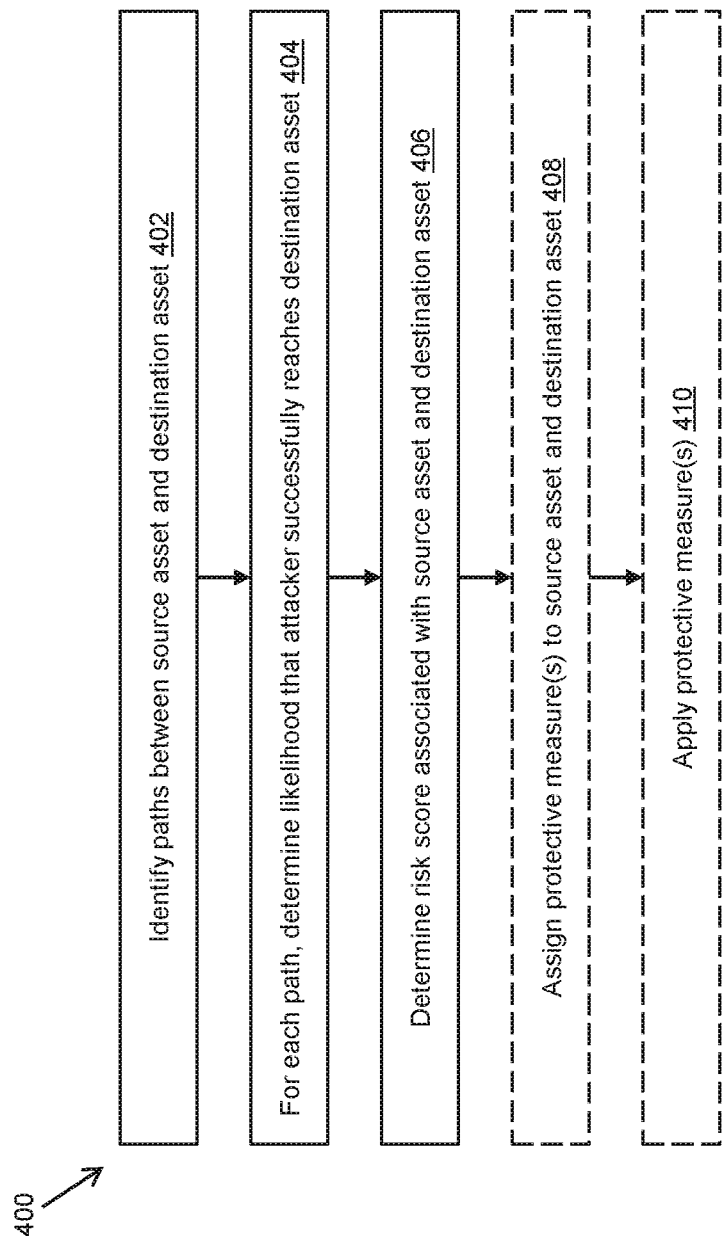

METHODS AND SYSTEMS FOR THREAT EVALUATION BASED ON ANTICIPATED PATHWAYS OF MALICIOUS ACTORS

TECHNICAL FIELD

The present disclosure relates to methods, systems, and computer program products for evaluating malicious threats in a cloud infrastructure and/or network through predictive modeling of malicious actors within the cloud infrastructure and/or network.

BACKGROUND OF THE INVENTION

Conventional threat detection mechanisms for detecting malicious threats in a cloud infrastructure and networks primarily focus on evaluating risk and issuing alerts based on the actions a malicious actor has performed once already operating inside the cloud infrastructure or network. In fact, most systems either detect point events without correlating the events in a sequence, and if event sequence correlation is performed, the correlation is from left to right (advanced persistent threat (APT) progress), meaning the risk associated with the actions that the actor already performed in the system regardless of whether the flow of actions may lead to a breach or to a dead end of the incident. These mechanisms often fail to proactively assess the real risk associated with the actions of a malicious actor since they lack the assessment of where the threat actor may be getting from where the actor is currently located.

SUMMARY OF THE INVENTION

The present disclosed subject matter, also referred to herein as the disclosure, includes methods, systems, and computer program products for evaluating malicious threats in a cloud infrastructure and/or network. As will be described, embodiments of the present disclosure provide methods, systems, and computer program products that first identify the critical assets of the cloud infrastructure and/or network to be protected (colloquially referred to as "crown jewels"), then calculate the possible paths to the crown jewels from right to left, from the inner system to the perimeter (in what is called Shift Left Threat Detection) and prioritize at higher risk, flows of actions that are progressing on these paths (from left to right) before the actions reach the crown jewels. The embodiments of the present disclosure calculate the paths an actor may continue taking. Each path can then be associated with a risk score and is used to improve the risk associated with an event at a given point. Essentially the embodiments of the present disclosure combine right to left paths (associated with the paths calculated by the embodiments of the present disclosure from the assets of the cloud infrastructure and/or network backward to the perimeter, with left to right risks (associated with the actions of the actor so far and where the actor is currently located). In other words, aspects of the present disclosure provide mechanisms for evaluating cybersecurity threats by contemplating the potential actions of malicious actors, in some cases by simulating the progression of malicious actors from a source asset of a cloud infrastructure and/or network to a destination asset of the cloud infrastructure and/or network (usually a critical asset of the cloud). In certain embodiments, the configuration of some the assets in the network is such that once a malicious actor has accessed a source asset, the malicious actor can access a destination asset from the source asset with certainty (i.e., with probability 1) should the malicious actor so choose (and given enough time). In such embodiments, the simulated progression provides an immediate risk assessment for such destination assets. In other embodiments, the configuration of some the assets in the cloud or network is such that once a malicious actor has accessed a source asset, the malicious actor can access a destination asset from the source asset with non-certainty (i.e., with probability less than 1) should the malicious actor so choose. In such embodiments, the simulated progression is achieved by generating a numerical representation (or estimate) of the risk associated with a malicious actor accessing the destination asset from the current location (i.e., current asset) of the malicious actor.

Embodiments of the present disclosure are directed to a method for evaluating threats in a cloud environment having a plurality of assets. The method comprises: for each pair of one or more pairs of the assets, obtaining one or more identified paths from a first asset of the pair to a second asset of the pair, each path of the one or more identified paths defined by a sequence of assets that includes the first and second assets; and for each path of the one or more identified paths, determining a likelihood that an attacker that is at the first asset will successfully reach the second asset via the path.

Optionally, the method further comprises: for each pair of the one or more pairs, determining a risk score for the pair based on the determined likelihoods for the one or more identified paths, the risk score indicative of a risk of the attacker reaching the second asset from the first asset.

Optionally, determining the risk score for the pair includes summing the determined likelihoods of the one or more identified paths.

Optionally, the method further comprises: for each pair of the one or more pairs, assigning a protective measure to the pair in accordance with the risk score to mitigate risk of the attacker reaching the second asset from the first asset.

Optionally, the method further comprises: detecting a malicious attack at a first asset of one of the one or more pairs; and applying to the cloud environment the protective measure assigned to the pair.

Optionally, for each path of the one or more identified paths, determining the likelihood includes: for each set of adjacent assets in the sequence of assets, determining a probability that the attacker will successfully advance from a current asset of the set to a next asset of the set, and multiplying together the determined probabilities to determine an overall probability that the attacker will successfully advance from the first asset to the second asset.

Optionally, determining the probability is performed using a set of rules and a large language model.

Optionally, determining the probability is based on a current security posture of the cloud environment and a current topology of the cloud environment.

Optionally, for each set of adjacent assets in the sequence of assets, the probability that the attacker will successfully advance from a current asset of the set to a next asset of the set is unity.

Optionally, for at least one set of adjacent assets in the sequence of assets, the probability that the attacker will successfully advance from a current asset of the set to a next asset of the set is less than one.

Optionally, the second asset is designated by the cloud environment as a critical asset to the cloud environment.

Optionally, the method further comprises: for a given pair of the one or more pairs, obtaining one or more identified attack paths to the second asset of the given pair, each identified attack path originating at a different asset; and calculating a risk score indicative of a risk of the attacker reaching the second asset of the given pair from any one of the identified attack paths.

Optionally, the attacker is a simulation of a malicious attacker.

Optionally, for each path of the one or more identified paths, determining the likelihood is performed using a large language model (LLM).

Optionally, the LLM determines the likelihood based on a plurality of parameters including: parameters of the assets of each pair, and the topology of the cloud environment.

Embodiments of the present disclosure are directed to a method for evaluating threats in a cloud environment having a plurality of assets in which the plurality of assets includes at least one asset designated by the network as a critical asset to the network. The method comprises the steps of: a) obtaining one or more identified paths from a source asset of the plurality of assets to a critical asset of the plurality of assets, each path of the one or more identified paths defined by a sequence of assets that includes the source asset and the critical asset; and b) for each path of the one or more identified paths, determining a likelihood that an attacker that is at the source asset will successfully reach the critical asset via the path.

Optionally, the method further comprises the step of: c) determining a risk score associated with an asset pair, defined by the source asset and the critical asset, based on the determined likelihoods for the one or more identified paths, the risk score indicative of a risk of the attacker reaching the critical asset from the source asset.

Optionally, the plurality of assets includes a plurality of critical assets, and the method further comprises the step of: d) repeating step a) through c) for each critical asset of the plurality of critical assets.

Optionally, determining a likelihood that an attacker that is at the source asset will successfully reach the critical asset via the path is performed using a large language model (LLM).

Embodiments of the present disclosure are directed to a computer system for evaluating threats in a cloud environment having a plurality of assets. The computer system comprises: a non-transitory storage medium that stores program code; and a computerized processor configured to execute the program code to: for each pair of one or more pairs of the assets, obtain one or more identified paths from a first asset of the pair to a second asset of the pair, each path of the one or more identified paths defined by a sequence of assets that includes the first and second assets, and for each path of the one or more identified paths, determine a likelihood that an attacker that is at the first asset will successfully reach the second asset via the path.

This document references terms that are used consistently or interchangeably herein. These terms, including variations thereof, are as follows:

A "computer" includes machines, computers and computing or computer systems (for example, physically separate locations or devices), endpoint clients, servers, routers, switches, network relays, access points, gateways, computer and computerized devices, data processors, processing systems, computing cores (for example, shared devices), and similar systems, workstations, modules, and combinations of the aforementioned. The aforementioned "computer" may be in various types, such as a personal computer (e.g., laptop, desktop, etc.), or any type of computing device, including mobile devices that can be readily transported from one location to another location (e.g., smart phone, tablet, personal digital assistant (PDA), mobile telephone, cellular telephone, etc.).

A "server" is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software-based emulation of a computer.

An "asset" of a cloud infrastructure/network is any entity of the cloud infrastructure/network that enables a potential move to another entity of the cloud infrastructure/network given permissions or settings associated with the assets or given some vulnerabilities of the assets and/or the cloud infrastructure/network as a whole. An "asset" can be in the form of or a cloud service or hardware that hosts a cloud service, including any computer or computing device, in accordance with the "computer" defined above, that is part of the cloud infrastructure/network, for example via a connection through one or more networks. Thus, hardware or cloud service assets of a cloud infrastructure/network can include, but are not limited to, any computer or computing device in accordance with the "computer" defined above, computerized storage media, functions, and servers such as Amazon EC2, Amazon S3, Amazon RDS, Amazon Lambda, Amazon DynamoDB, Amazon VPC, Amazon CloudFront, Amazon Route 53, Amazon IAM, Amazon SNS services in AWS, Google Compute Engine (GCE), Google Cloud Storage, Google Cloud SQL, Google Cloud Functions, Google Cloud Bigtable, Google Cloud Firestore, Google Virtual Private Cloud (VPC), Google Cloud CDN, Google Cloud DNS, Google Cloud Identity and Access Management (IAM), Google Cloud Pub/Sub in GCP, and Azure Virtual Machines, Azure Blob Storage, Azure Database for MySQL, Azure Database for PostgreSQL, Azure Functions, Azure Cosmos DB, Azure Virtual Network (VNet), Azure Content Delivery Network (CDN), Azure DNS, Azure Active Directory (Azure AD), Azure Service Bus in Microsoft Azure. An "asset" can also be of a type that is not a hardware or cloud service asset but that is in some way associated with a hardware or cloud service asset, for example by being run/executed or stored on a hardware or cloud service asset. Examples of such assets include, but are not limited to, executable software, computer processes that are executed from program calls or software executions, file systems, databases, applications, user groups, and the like. Thus, for example, a database server that maintains a credentials database could be an asset, and the credentials database stored on the database server is itself also an asset, and the group of users having credentials matching the credentials database is also an asset. As another example, a limited-access database stored on a computer (e.g., database server) is also an asset, and the group of authorized users that can access the limited-access database is also an asset.

Unless otherwise defined herein, all technical and/or scientific terms used herein have the same meaning as commonly understood by one of ordinary skill in the art to which the disclosure pertains. Although methods and materials similar or equivalent to those described herein may be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present disclosure are herein described, by way of example only, with reference to the accompanying drawings. With specific reference to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

Attention is now directed to the drawings, where like reference numerals or characters indicate corresponding or like components. In the drawings:

FIG. 4 is a flow diagram illustrating a process for evaluating malicious threats in a cloud environment, according to embodiments of the present disclosure.

DESCRIPTION OF THE PREFERRED EMBODIMENTS

Figure 1:
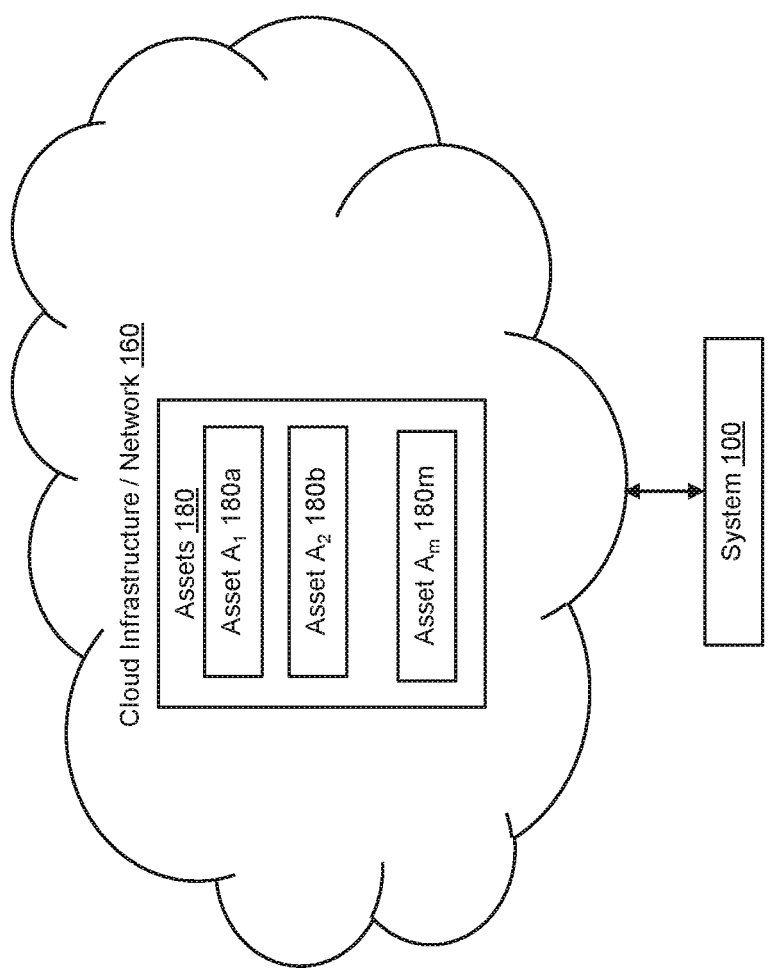
FIG. 1 is a diagram illustrating a cloud infrastructure/network environment in which embodiments of a system according to the disclosed subject matter can operate.

The present disclosure is directed to methods, systems, and computer program products for evaluating malicious threats in a cloud infrastructure or network.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the examples. The disclosure is capable of other embodiments or of being practiced or carried out in various ways.

As will be appreciated by one skilled in the art, aspects of the present disclosure may be embodied as a system, a method, or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present disclosure may take the form of a computer program product embodied in one or more non-transitory computer readable (storage) medium(s) having computer readable program code embodied thereon.

Referring now to the drawings, FIG. 1 shows an example environment in which certain embodiments of the disclosed subject matter can operate. As illustrated, a system 100 according to embodiments of the disclosure is connected, for example via one or more networks (not shown), to a cloud infrastructure or network 160 (referred to herein interchangeably as cloud environment, or simply cloud). The cloud 160 includes a plurality of assets $A_1$ to $A_m$ ("m" denoting the last member of a series) 180a, 180b, 180m, collectively referred to as assets 180. The assets 180 are linked or otherwise connected to each other through one or more networks connected through the cloud 160. To this end, the assets 180 of the cloud 160 form a type of network.

The assets 180 of the cloud 160 can include any type of asset that falls within the definition of an "asset" as defined above.

By way of introduction, cloud infrastructure and/or networks typically designate certain assets as being critical assets to the cloud infrastructure/network, and the security posture of the cloud infrastructure/network is tuned to protect the critical assets. The designation of criticality of an asset for a given cloud infrastructure/network may depend on various factors considered by the cloud infrastructure/network, for example the value the cloud infrastructure/network places on a particular asset. As a broad example, a cloud infrastructure/network could designate any asset that contains information that is categorized by the cloud infrastructure/network as sensitive information as a critical asset. Further examples of critical assets include, but are not limited to, personally identifiable information (PII), databases that store sensitive information such as credential information (e.g., credentials databases), payroll information, etc., computers that store or maintain databases that store such sensitive information, computers that store proprietary data and/or proprietary information, network devices (e.g., routers, access points, etc.) that provide a direct link to other critical assets of the cloud infrastructure/network, and the like.

Malicious actors (i.e., malicious attackers) typically infiltrate cloud infrastructure and networks through any accessible asset of the cloud infrastructure/network. Once an attacker has infiltrated the cloud infrastructure/network by accessing an asset, the malicious attacker travels between different assets of the cloud infrastructure/network until the attacker reaches a critical asset, at which point the attacker can take various malicious actions, including, for example, exfiltration of data stored on (or other associated with) the critical asset, encryption of data (i.e., ransomware), and the like. For the most part, the malicious attacker does not know where they are heading while traveling between the assets, but eventually can reach a critical asset if given enough time.

As discussed above, the assets of a cloud infrastructure/network are connected to each other, and in general terms form a type of network. Some of the assets of the network are strongly connected to each other, whereas other assets are not strongly connected to each other. A pair of assets are defined as being strongly connected if a party (e.g., an attacker), after successfully gaining access to a first asset of the pair, will be able to gain access to a second asset of the pair with certainty (i.e., with probability 1) if the party so chooses and given enough time. An example of a pair of strongly connected assets is a credentials database and its corresponding set/group of matching users. Another example of a pair of strongly connected assets is a group of authorized users and the database(s) that can be accessed only by that group of authorized user. In principle, if a given asset is designated as a critical asset (by the cloud infrastructure/network), then that designation can also be implicit to any asset that is strongly connected to that critical asset. Thus, if a credentials database is designated as a critical asset, then the corresponding set/group of matching users can also be considered as a critical asset.

Other assets of the cloud infrastructure/network are not strongly connected, i.e., there are weaker relationships between some of the assets. For a pair of assets that are not strongly connected (referred to as "weaker connected assets"), there is some non-unity probability that a party (e.g., an attacker), after successfully gaining access to a first asset of the pair, will be able to gain access to a second asset of the pair if the party so chooses. However, a more thorough analysis is needed in order to determine the probability (likelihood) of an attacker reaching a given asset, such as a critical asset, via a weaker connected asset. As will be discussed, certain embodiments of the present disclosure address the problem of calculating probability for weaker connected assets.

Bearing the above in mind, the system 100 according to certain embodiments of the present disclosure can take provide security alerts based on an assessment of the risk of an attacker reaching any asset of a cloud infrastructure/network, and in particular a critical asset of the cloud infrastructure/network. In general, if the system 100 knows that there is a critical asset in the topology of the cloud infrastructure/network, and the system 100 knows that an attacker is located at an asset (i.e., a source asset) from which the attacker can reach the critical asset (with some probability, which can be unity or non-unity depending on the configuration of the assets/network), the system 100 can evaluate the risk associated with the sequence of assets along the path the attacker must traverse to reach the critical asset, which allows the system 100 to proactively prevent the attacker from reaching the critical asset. The system 100 according to embodiments of the present disclosure can evaluate this risk in the case where the source asset and the critical asset are strongly connected, and also in the case where the source asset and the critical asset are weaker connected assets. The system 100 according to certain embodiments of the disclosure evaluates this risk based on simulated attackers at various assets, such that when an actual attack is detected at any source asset (which can be a critical asset or a non-critical asset), the system 100 can optionally execute a predesigned protective measure that is associated with the evaluated risk and the source asset at which the actual attack is detected.

As will become apparent, a key feature of the system 100 according to embodiments of the present disclosure is the methodology according to which the system 100 operates, which is generally the reverse of the methodologies by which conventional threat detection mechanisms, that evaluate risk and issue alerts based on the actions that a malicious actor has performed once already operating inside the network, operate. The methodology by which the system according to embodiments of the present disclosure operates is referred to herein as "reverse path" methodology.

Figure 2:
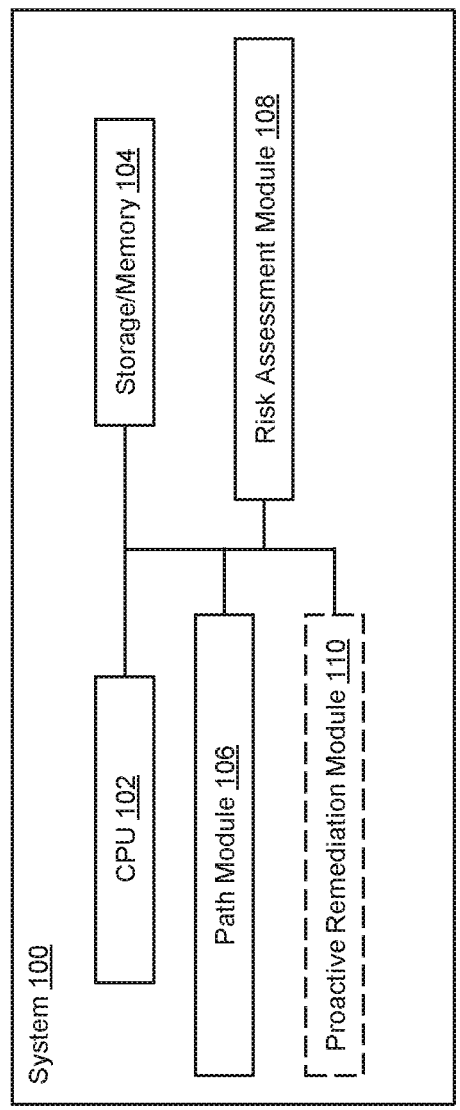
FIG. 2 is a diagram of the architecture of an exemplary system embodying the disclosed subject matter.

With continued reference to FIG. 1, refer also to FIG. 2 which shows an example architecture of the system 100 according to a non-limiting embodiment of the present disclosure. The system 100 includes multiple components in hardware and/or software. Although the components of the system 100 are shown in a single block, the components do not all have to be collocated. For example, the components of the system 100 can be spread throughout different location, and can be connected to each other through one or more networks, for example a cloud network.

The system 100 includes one or more processors in a central processing unit (CPU) 102 linked to storage/memory 104. The CPU 102 is in turn, linked to components (computerized components or modules), such as a path module 106, a risk assessment module 108, and an optional remediation module 110.

While these components 102 through 110 are the most germane to the system 100, other components are permissible. Parenthetically, the term "linked" as used herein, includes both wired and/or wireless links, either direct or indirect, such that the components 102 through 110, are in electronic and/or data communications with each other, either directly or indirectly. As used herein, a "module", for example, includes a component for storing instructions (e.g., machine readable instructions) for performing one or more processes, and including or associated with processors, e.g., the CPU 102, for executing the instructions.

The CPU 102 is formed of one or more processors, including hardware processors, and performs methods of the disclosure, as shown in FIG. 4 and detailed below. The methods of FIG. 4 may be in the form of programs, algorithms, and the like. For example, the processors of the CPU 102 may include x86 Processors from AMD (Advanced Micro Devices) and Intel, Xenon® and Pentium® processors from Intel, as well as any combinations thereof.

The storage/memory 104 stores machine-executable instructions executed by the CPU 102 for performing the methods of the disclosure (e.g., as shown in FIG. 4). The storage/memory 104, for example, may also provide temporary storage for the system 100.

Generally speaking, the system 100 according to certain embodiments of the disclosure is operative to: i) obtain paths that are identified as potential/possible paths from a source asset to a destination asset (which can be a critical asset), where each path from the source asset to the destination asset is defined by a sequence of assets that includes the source asset and the destination asset (where the first asset in the sequence is the source asset and the last asset in the sequence is the destination asset), and ii) determine for each of the obtained identified paths the likelihood that an attacker, that is located at the source asset, will successfully reach the destination asset via the path. The system 100 can also assign a risk score for the pair of assets composed of the source asset and destination asset (referred to as a source-destination asset pair), based on the determined likelihoods associated with the identified paths. In certain optional embodiments, the system 100 may then assign a protective measure to the source-destination asset pair based on the risk score.

The aforementioned functions are performed, in certain embodiments, by one or more of the path module 106, the likelihood calculation module 108, and the risk assessment module 110.

Parenthetically, it is noted that a source-destination asset pair may be separated by zero or more assets. For source-destination asset pairs in which the source and destination assets are separated by zero assets, the destination asset may be directly reachable from the source asset, i.e., an actor may move to the destination asset directly from the source asset (if the actor so chooses). For source-destination asset pairs in which the source and destination assets are separated by one or more assets, the destination asset may be indirectly reachable from the source asset, i.e., an actor may move to the destination asset via one or more other assets that are reachable from the source asset (if the actor so chooses).

The path module 106 functions to obtain, for any pair of assets (defined by a first (source) asset and a second (destination) asset), paths that are identified as possible paths from the first asset to the second asset, i.e., from a source asset to the destination asset. The second asset in a pair of assets can be a critical asset, i.e., an asset that has been designated by the cloud infrastructure/network as being critical to the cloud infrastructure/network, or can be a non-critical asset.

The path module 106 can obtain the identified possible paths in various ways. In certain embodiments, the path module 106 obtains the identified paths by receiving the identified paths from any one of a various number of tools that function to identify the possible paths from one asset of a network to another asset of the network. Such tools typically identify the paths based on various parameters, including, for example, the cloud or network topology. In other embodiments, the path module 106 obtains the identified paths by performing functions to identify the paths, for example, by performing the functions of any one of the aforementioned tools or by implementing one or more of the aforementioned tools as part of the path module 106.

One non-limiting example of a tool that functions to identify possible crown jewels (i.e., critical assets) in a cloud infrastructure or network is Macie from Amazon Web Services (AWS), referred to as Amazon Macie. Amazon Macie detects personally identifiable information (PII) data and access permissions. Leveraging Amazon Macie or any other data security posture management (DSPM) solution can identify crown jewels or high-risk data assets that an attacker might target in the cloud network, and can enable identification of paths to crown jewels.

For any source-destination asset pair, the set of possible (identified) paths from the first asset (source asset) of the pair to the second asset (destination asset) of the pair can be expressed as $P=\{p_1, p_2, \ldots, p_n\}$, where "n" denotes the last member of a series and also represents the number of possible paths. Each path is represented as a sequence of assets expressed as $\{a_1, a_2, \ldots, a_k\}$, where "k" denotes the last member of a series and represents the index of the last asset in the path. For any source-destination asset pair, the path module 106 functions to obtain the identified paths, i.e., the set P, for that source-destination asset pair.

For a sequence of assets, an asset in the sequence can be reached (accessed) from the preceding asset in the sequence with some non-zero probability. That probability is unity in the case of strongly connected assets, and that probability is non-unity in the case of weaker connected assets. Thus, for the sequence $\{a_1, a_2, \ldots, a_k\}$, the asset $a_2$ can be reached from the asset $a_1$ with some non-zero probability, the asset $a_3$ can be reached from the asset $a_2$ with some non-zero probability, and so on and so forth, up to the asset $a_k$ which can be reached from the asset $a_{k-1}$ with some non-zero probability. In this context, being "reachable" means being accessible, for example through connections in the network between adjacent assets in the sequence.

For any path, the sequence of assets that represent the path includes the source asset and the destination asset. The source asset is the first asset in the sequence and the destination asset is the last asset in the sequence. Thus, for the sequence $\{a_1, a_2, \ldots, a_k\}$, $a_1$ is the source asset and $a_k$ is the destination asset. The destination asset, in the context of several embodiments of the present disclosure, is typically a critical asset, but the destination asset can in theory be any asset that is reachable from the source asset.

Figure 3:
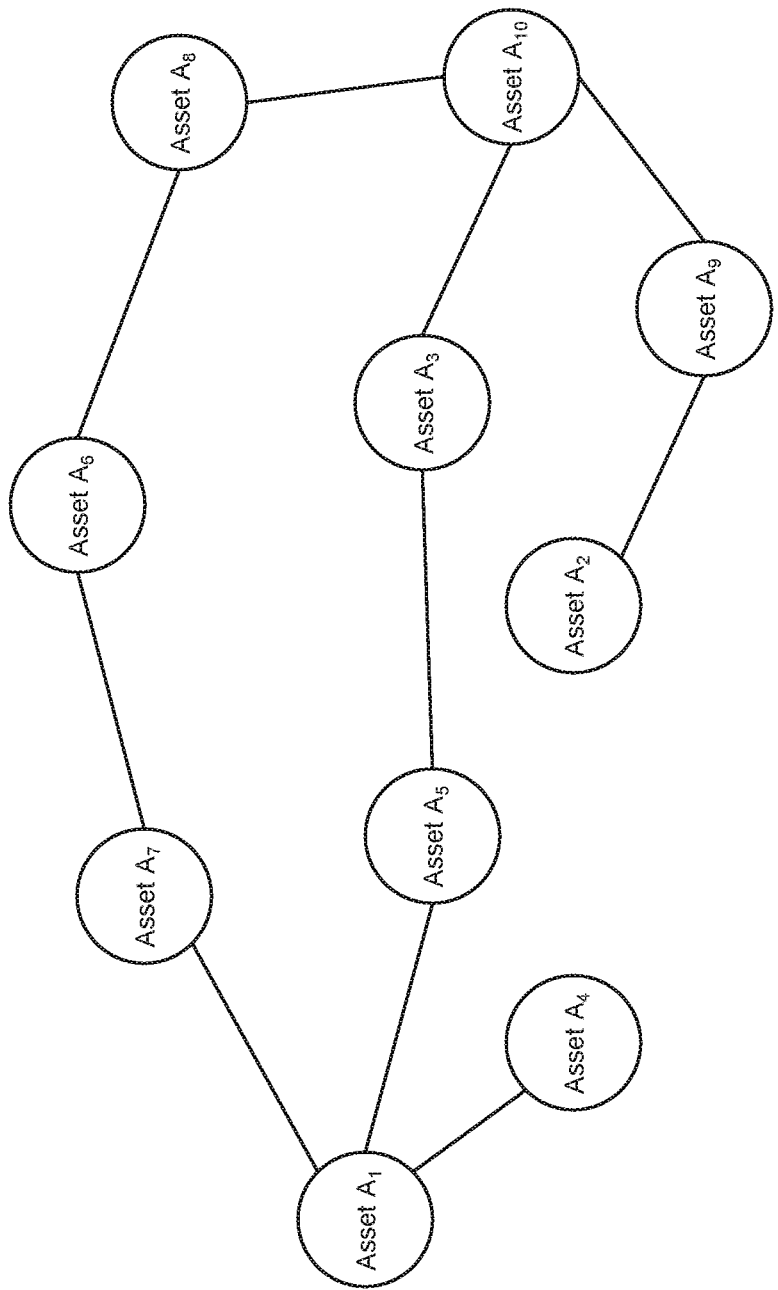
FIG. 3 is a schematic representation of assets of a cloud infrastructure/network and connections between the assets.

In order to explain the above notation for paths and sequences more clearly, reference is made to FIG. 3 which shows assets $A_1$ to $A_{10}$ arranged according to a network topology, where a line that connects between two assets indicates that one of the assets is reachable from the other of the assets. It is noted that the subscripts for assets $A_1$ to $A_{10}$ refers to the name of the asset and not the particular order or index of the asset in a particular sequence.

Suppose, for example, that $A_1$ is a source asset and $A_{10}$ is a destination asset (which may be a critical asset). Here, for the source-destination asset pair $(A_1, A_{10})$ there are two paths $\{p_1, p_2\}$ which exist from $A_1$ to destination asset $A_{10}$. The first path $p_1$ is represented by the sequence $\{A_1, A_5, A_3, A_{10}\}$, and the path $p_2$ is represented by the sequence $\{A_1, A_7, A_6, A_8, A_{10}\}$. Thus, for $p_1$ $\{a_1, a_2, a_3, a_4\}=\{A_1, A_5, A_3, A_{10}\}$ and for $p_1$ $\{a_1, a_2, a_3, a_4, a_5\}=\{A_1, A_7, A_6, A_8, A_{10}\}$. The path module 106, given the source-destination asset pair $(A_1, A_{10})$, may obtain the paths $p_1$ and $p_2$ (represented by their associated sequences $\{A_1, A_5, A_3, A_{10}\}$ and $\{A_1, A_7, A_6, A_8, A_{10}\}$).

Continuing with the example of FIG. 3, if an attacker successfully infiltrates the network through asset $A_1$, the attacker can theoretically successfully reach the destination asset $A_{10}$ by traversing either of the two paths $p_1$ or $p_2$. For example, if traversing the first path $p_1$, the attacker can theoretically successfully reach the destination asset $A_{10}$ by transitioning from $A_1$ to $A_5$, then transitioning from $A_5$ to $A_3$, and finally transitioning from $A_3$ to $A_{10}$. Similarly, if traversing the first path $p_2$, the attacker can theoretically successfully reach the destination asset $A_{10}$ by transitioning from $A_1$ to $A_7$, then transitioning from $A_7$ to $A_6$, then transitioning from $A_6$ to $A_8$, and finally transitioning from $A_8$ to $A_{10}$.

Parenthetically, it is noted that in the example illustrated in FIG. 3, there may be additional source-destination asset pairs. In fact, and in general, any two assets in which one of the two assets can be reached from the other of the two assets constitutes a source-destination asset pair. Thus, $(A_1, A_4)$, $(A_1, A_5)$, $(A_1, A_3)$, $(A_1, A_7)$, $(A_1, A_6)$, $(A_1, A_8)$, $(A_5, A_{10})$, $(A_5, A_3)$, $(A_2, A_9)$, and $(A_2, A_{10})$ are just a few of the examples of source-destination asset pairs in FIG. 3 (and there are clearly other pairs).

The risk assessment module 108 functions to determine (calculate) a likelihood that an attacker that is at a first asset (source asset) of a source-destination asset pair will successfully reach the second asset (destination asset) of the source-destination asset pair. This likelihood determination is also referred to as a probability determination/calculation or a risk calculation/determination. In order to determine this likelihood for a source-destination asset pair, the risk assessment module 108 first determines the likelihood, for each identified path (obtained by the path module 106), that the attacker will successfully reach the destination asset of the source-destination asset pair from the source asset of the source-destination asset pair.

In general, if the likelihood/risk/probability of an attacker successfully advancing from a current asset at to a next asset $a_j$ in the sequence of assets for a given identified path $p_l$ is denoted by $R(a_i, a_j)$, then the likelihood/risk/probability for an attacker successfully reaching the destination asset $a_k$ from the source asset $a_1$ via that identified path $p_l$ is given by the expression:

$$R_{p_l} = \prod_{i=1}^{k-1} w_i R(a_i, a_{i+1}),$$

where $a_i$ and $d_{i+1}$ are adjacent assets in the sequence, and $w_i$ are decaying weights that become smaller the farther the attacker is from a critical asset (i.e., crown jewel). The decaying weights consider the challenge of hopping between assets as well as the fact that the farther attacker is from a critical asset, the less likely the attacker will make all necessary consecutive hops along the path to reach the critical asset.

The risk assessment module 108 may also function to combine the likelihood/risk/probability of the identified paths for the pair of assets to determine/calculate an overall likelihood/risk/probability that an attacker that is at the first asset will successfully reach the second asset. In practice, the combination can be performed using a simple summation by summing over all of the identified paths, i.e., all of the paths in the set P. Thus, for example, the overall (total) likelihood/risk/probability can be expressed as follows:

$$T = \sum_{l=1}^{n} R_{pl}.$$

It is noted, however, that a weighted sum can also be used, where different weights are assigned to each path. The weights can be calculated based on various parameters, such as the operating system of the assets of the pair, the current security posture of the cloud infrastructure/network, and the cloud network topology.

The overall (total) likelihood/risk/probability can be in the form of a risk score, which is indicative of the risk associated with an attacker successfully reaching the destination asset from the source asset (using any of the possible paths from the source to the destination).

The risk assessment module 108 can perform the above functions for multiple pairs of assets (i.e., for multiple source-destination asset pairs), and preferably for each pair of assets in which the destination asset in the pair is a critical asset.

In certain cases, as mentioned above, the source asset and the destination asset may be strongly connected, in which case the probability that an attacker that is at the source asset will successfully reach the destination asset is unity. To illustrate this point, consider the case in the example described with reference to FIG. 3 in which the assets $A_1$ and $A_{10}$ are strongly connected. In such a case, an attacker can, with certainty, reach asset $A_{10}$ from asset $A_1$. Furthermore, all of the remaining assets in the sequence of the path $p_1$, i.e., $A_5$, $A_3$, are strongly connected (and the same goes for the assets for path $p_2$). Moreover, if the asset $A_{10}$ is a critical asset, then $A_1$ is a critical asset, as are all of the remaining assets in the sequence of the path $p_1$ and the remaining assets in the sequence of the path $p_2$, i.e., $A_7$, $A_6$, $A_8$.

In cases of strongly connected source-destination asset pairs, the calculations of the $R(a_i, a_j)$ values are trivial as each $R(a_i, a_j)$ value for a set of adjacent assets is by definition unity (per the definition of strong connection). In fact, once a strongly connected relationship is identified for a source destination asset destination pair, no calculations of $R(a_i, a_j)$ values for sets of adjacent assets in the sequence may be needed, as it is known that each $R(a_i, a_j)$ value for adjacent assets is unity by definition. Moreover, once a strongly connected relationship is identified for a source-destination asset destination pair, no calculations for the $R_{pl}$ values may be needed, as it is known that the each $R_{pl}$ value is unity, since it is a product of 1's (or product of the decaying weights), as given by the expression $$R_{pl} = \prod_{i=1}^{k-1} w_i R(a_i, a_{i+1}).$$

For the trivial case of a strongly connected source-destination asset pair, the calculation of the overall (total) likelihood/risk/probability (T) is also trivial, since it is in principle a sum of 1's (or a weighted sum of 1's).

In cases where the source asset and the destination asset are weaker connected assets, the $R(a_i, a_j)$ value for at least one of the sets of adjacent assets is not unity (i.e., probability less than 1). In other words, for at least one value of i, the value of $R(a_i, a_{i+1})$ will be less than 1. In such cases, the calculation of the non-unity $R(a_i, a_j)$ value is non-trivial and may be more computationally complex.

According to certain preferred embodiments, the risk assessment module 108 performs the calculation of the $R(a_i, a_j)$ values offline. For such offline calculations, simulated attacks are used by the risk assessment module 108 to predictively assess risk. The $R_{pl}$ value and the overall (total) likelihood/risk/probability (T) may also be calculated offline. In certain optional embodiments, protective measures, based on the predicted risk (using the simulated attacks) can then be implemented (using, for example, the proactive remediation module 110) to provide online protection of the network assets and the network as a whole, i.e., protection during real-time operation of the network.

As will be discussed, for the non-trivial case in which the assets of a source-destination asset pair are weaker connected assets, the calculation of the probability of an attacker being able to reach a next asset from a current asset (i.e., the calculation of $R(a_i, a_j)$) is one of the most processing intensive calculations performed by system 100 (e.g., the risk assessment module 108), in particular as compared to the calculations $R_{pl}$ and T, which are less-intensive calculations (being multiplication and summation, respectively). This computational complexity is due in part to the number of variables and parameters (which will be discussed below) upon which the non-trivial calculation of $R(a_i, a_j)$ is based. In view of the computational complexity, the calculation of $R(a_i, a_j)$ is ideal for offline calculation, as performing calculation of $R(a_i, a_j)$ online (i.e., in real-time) may take up too many computing resources. In addition, using conventional techniques to calculate $R(a_i, a_j)$ is also computationally intensive. It is therefore a feature of certain embodiments of the present disclosure that the system 100 (e.g., the risk assessment module 108) employ generative artificial intelligence (AI), in particular generative AI that utilizes a large language model (LLM), to perform the calculation of the $R(a_i, a_j)$ values offline, in particular in cases where assets $a_i$ and $a_j$ are weaker connected assets. The risk assessment module 108 may also employ generative AI with a LLM to calculate $R_{pl}$ and T. As is generally understood in the art, generative AI systems use generative models such as LLMs to statistically sample new data based on the training data set that was used to create the generative AI system. Generative AI systems have various capabilities, typically dependent upon the modality of the data set used for training. For example, for text modality, a generative AI system, such as ChatGPT, is trained on words or word tokens, and is capable of executing natural language processing (NLP) tasks.

Bearing the above in mind, according to certain embodiments of the present disclosure, the risk assessment module 108 determines the risk associated with an attacker advancing from one asset to a next asset in the sequence of assets for a path, using a combination of rule-based scoring and generative AI, in particular generative AI that utilizes a large language model (LLM).

According to certain embodiments of the present disclosure, the risk assessment module 108 utilizes a text-modality generative AI system, in particular by implementing an LLM, such as, for example ChatGPT (developed by OpenAI) or a similar LLM or a system that executes the LLM used by ChatGPT or similar LLM, or any other suitable third-party LLM or in-house (e.g., proprietary) LLM, or a system that executes such an LLM. More specifically, according to certain embodiments, the risk assessment module 108 utilizes natural language processing (NLP) together with certain rules, in accordance various parameters associated with the assets in the source-destination asset pair and associated with the network as a whole, to determine the $R(a_i, a_j)$ values for each path.

As mentioned above, the risk assessment module 108, in certain preferred embodiments, executes functions for simulated attacks. In other words, the risk assessment module 108 determines the likelihood/risk/probability of an attacker successfully reaching a second asset from a first asset using a simulated attack (i.e., the attacker is a simulation of a malicious attacker). In such embodiments, the parameters associated with the assets and associated with the network as a whole, upon which each $R(a_i, a_j)$ value is calculated, can be static parameters and/or semi-dynamic parameters. Static parameters include, for example, the operating system of the assets of the pair, the current security posture of the cloud infrastructure/network, and the cloud network topology. Semi-dynamic parameters can include, for example, the usual behavior associated with the assets (such as privileges of the users that usually operate the assets), and the open communication ports of the assets.

For example, an input text prompt can be provided to the LLM of the risk assessment module 108 such that the risk assessment module 108 outputs $R(a_i, a_j)$. The input prompt can include text-based descriptions of the cloud topology, current security posture, and various static and/or semi-dynamic parameters, and a text prompt, e.g., "Given the cloud topology, the current security posture, the privileges of the users that usually operate the assets, and the operating system of the two assets, evaluate the probability of an attacker successfully advancing from the first asset to the second asset".

In certain embodiments, the parameters may also include dynamic parameters. In such embodiments, the calculations of $R(a_i, a_j)$ values are based on actual malicious attacks (i.e., not simulated attacks). Dynamic parameters can be determined only at runtime, and include, for example, the behavior of the attacker as detected thus far (including the type of the attack). It is noted that because the dynamic parameters can be determined only at runtime, the calculation of $R(a_i, a_j)$ values, in particular for weaker connected assets, may require running multiple LLMs at real-time for any newly identified suspicious behavior, which can consume a very large amount of processing resources.

In certain embodiments, the proactive remediation module 110 functions to assign one or more protective measure to each pair of assets, preferably each pair of assets in which the second asset of the pair is a critical asset. The proactive remediation module 110 makes the assignment of the protective measure(s) for each pair of assets in accordance with the risk score associated with the pair of assets, as calculated, for example, by the risk assessment module 108. For each pair, the protective measure(s) mitigates the risk of an attacker reaching the destination asset from the source asset. The protective measure(s) can include, for example, taking steps to modify the security posture of the cloud infrastructure/network by, for example, executing anti-malware software of functions to contain malicious attacks at assets that are several transitions (steps) away from the critical asset, quarantining the asset by blocking the asset from accessing the network (i.e., cutting the asset off from the network), disabling the asset to restrict access to the network, relocating sensitive data stored at the critical asset to another asset(s) of the network that is/are safe from the attack or to another asset(s) that is part of a separate network that is safe from the attack, backing up sensitive data on another asset(s) of the network that is/are safe from the attack or to another asset(s) that is part of a separate network that is safe from the attack, etc.

In embodiments in which the risk assessment module 108 calculates the $R(a_i, a_j)$ values for each path of a source-destination asset pair offline, the proactive remediation module 110 can apply to the network the protective measure(s) assigned to a source-destination asset pair in response to detection of an actual (i.e., non-simulated) malicious attack at the source asset of the pair. For example, upon detecting an actual malicious attack, the proactive remediation module 110 may modify the security posture of the cloud infrastructure/network to protect against the attack. Alternatively, the proactive remediation module 110 can apply the aforementioned protective measure(s) before any actual attack is detected, so as to preemptively protect against attacks.

The detection of the actual attack can be performed by, for example, any suitable malware detection mechanism (such as an intrusion detection system) that is connected to the cloud infrastructure/network, and that provides detected attack information to the system 100.

In certain embodiments, the risk assessment module 108 can also function to assess the risk associated with particular critical assets. This may can help to combat situations in which multiple malicious actors attack the same critical asset, possibly using different paths from the same source asset, and possibly from different source assets. For example, high values of $R_{pl}$ for different values of l (i.e., different paths) may be an indication that the critical asset that is reachable from the same source asset through different paths is highly susceptible to attack, and the proactive remediation module 110 can make protective measure assignments to protect that critical asset as needed.

As another example, the risk assessment module 108 may combine $R_{pl}$ values for different source-destination asset pairs where the destination asset is common to all of the pairs to combat situations in which multiple malicious actors attack the same critical asset from different source assets. For example, the path module 106 may identify attack paths that lead to the same critical asset from different source (non-critical) assets, and the risk assessment module 108 can further function to assign a risk score to those identified attack paths. For example, refer again to FIG. 3 and the associated example in which asset $A_{10}$ is a critical asset. As described above, there are two paths $\{p_1, p_2\}$ from the source asset $A_1$ to the critical asset $A_{10}$ (represented by the sequences $\{A_1, A_5, A_3, A_{10}\}$ and $\{A_1, A_7, A_6, A_8, A_{10}\}$). However, critical asset $A_{10}$ can also be reached by source asset $A_2$, and therefore the path $p_3$ that is represented by the sequence $\{A_2, A_9, A_{10}\}$ may also be of interest, as this path $p_3$ provides an additional potential attack route to the critical asset $A_{10}$. Note that the attackers that use the paths $p_1, p_2$, and $p_3$ may be the same or different from each other. If the $R_{pl}$ values for the paths $p_1, p_2$, and $p_3$ are high, this may be an indication that the critical asset (e.g., $A_{10}$) that is reachable from different source assets (e.g., $A_1$ and $A_2$) through different paths is highly susceptible to attack, and the proactive remediation module 110 can make protective measure assignments to protect that critical asset as needed.

Attention is now directed to FIG. 4 which shows a flow diagram detailing a computer-implemented process 400 in accordance with embodiments of the disclosed subject matter. This computer-implemented process includes an algorithm for, among other things, evaluating malicious behavior (e.g., attacks) in cloud infrastructures/networks, connected, or otherwise linked to the system 100. Reference is also made to the elements shown in FIGS. 1-3. The process and sub-processes of FIG. 4 are computerized processes performed by various components of, or otherwise associated with, the system 100, including, for example, the CPU 102 and associated components, such as the path module 106, the risk assessment module 108, and the remediation module 110. The aforementioned process and sub-processes of FIG. 4 are for example, performed automatically, but can be, for example, performed manually, and are performed, for example, in real time.

The process 400 begins at step 402, where the system 100, for example using the path module 106, obtains, for an asset pair composed of a first (source) asset and a second (destination) asset, the identified possible paths from the source asset to the destination asset. As discussed above, the destination asset is typically a critical asset, and the identification of paths can be based on, for example, the topology of the network of which the assets are a part. As further discussed above, the obtaining of the identified paths can be performed by the system 100 (e.g., the path module 106) receiving the identified paths from one or more tool (that may be separate from the system 100) that function to identify the possible paths from one asset of a network to another asset of the network, or by the system 100 (e.g., the path module 106) performing the functions of any one of the aforementioned one or more tool, or by the system 100 (e.g., the path module 106) implementing any one of the aforementioned one or more tool as part of the system 100 (e.g., as part of the path module 106).

At step 404, the system 100, for example using the risk assessment module 108, determines, for each identified path obtained at step 402, a likelihood/probability/risk of an attacker successfully reaching the destination asset from the source asset. As discussed above, for each path, the risk assessment module 108 can calculate this likelihood/probability/risk for each path (denoted $R_{pl}$) by first calculating the likelihood/risk/probability of an attacker successfully advancing from one asset to the next asset in the sequence of assets that represent the path (denoted $R(a_i, a_j)$). As also discussed above, the risk assessment module 108 can then calculate $R_{pl}$ (for each path) by multiplying together the $R(a_i, a_j)$ values for that path, thereby obtaining the likelihood/probability/risk of an attacker successfully reaching the destination asset from the source asset for each path.

As discussed above, in the trivial case in which the source asset and the destination asset are strongly connected, all of the $R(a_i, a_j)$ values are unity (i.e., probability 1), as are $R_{pl}$ values. As further discussed above, in the non-trivial case in which the source asset and the destination asset are weaker connected assets, the risk assessment module 108 can calculate non-unity $R(a_i, a_j)$ values utilizing an LLM.

At step 406, the system 100, for example using the risk assessment module 108, determines a risk score associated with source asset and destination asset. As discussed above, the risk score determined at step 406 is the overall likelihood/risk/probability that an attacker that is at the source asset will successfully reach the destination asset, and can be calculated by combining together (e.g., summing) the $R_{pl}$ values calculated at step 404. The risk score can be assigned to the destination itself, and the risk score for the destination asset can be included in risk calculations in situations in which the destination asset forms part of one or more paths between another pair of assets (i.e., another source-destination asset pair), thus propagating the risk score associated with the destination asset to other assets that are potentially reachable from the destination asset.

At optional step 408, the system 100, for example using the proactive remediation module 110, assigns one or more protective measure the asset pair (i.e., the source asset and the destination asset). As discussed above, the assignment of the protective measure(s) is made in accordance with the risk score associated determined at step 406. The protective measure(s) assigned to the asset pair provides protection to the network against potential attacks.

The steps 402-408 may be repeated for each source-destination asset pair of the network. In this way, the system 100 can provide an assignment of a protective measure (or measures) to each source-destination asset pair.

At optional step 410, the system 100, for example using the proactive remediation module 110, may apply one or more of the protective measure(s) for one or more of the source-destination asset pairs, either prior to an attack, or in response to detection of an actual malicious attack at a source asset of the one of the source-destination asset pairs.

As should be apparent, the process 400 can, in principle, be performed for any pair of assets, including source-destination asset pairs in which the source asset and the destination asset are strongly connected (such that the simulated progression provides an immediate risk assessment without need for numerical representation/estimate of risk), the source asset and the destination asset are weaker connected assets (such that the simulated progression is achieved by a numerical representation/estimate of risk), the destination asset is a critical asset, the source asset is a critical asset, the source asset is a non-critical asset, the destination asset is a non-critical asset, the source asset and destination asset are separated by zero assets, the source asset and the destination asset are separated by one or more assets, and any reasonable combination thereof.

It is noted that in embodiments in which the various calculations/determinations of likelihood/risk/probability discussed above are performed for weaker connected assets, such calculations/determinations are typically estimations.

The implementation of the method and/or system of embodiments of the disclosure can involve performing or completing selected tasks manually, automatically, or a combination thereof. Moreover, according to actual instrumentation and equipment of embodiments of the method and/or system of the disclosed subject matter, several selected tasks could be implemented by hardware, by software or by firmware or by a combination thereof using an operating system.

For example, hardware for performing selected tasks according to embodiments of the disclosure could be implemented as a chip or a circuit. As software, selected tasks according to embodiments of the disclosed subject matter could be implemented as a plurality of software instructions being executed by a computer using any suitable operating system. In an exemplary embodiment of the disclosure, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present disclosure. A non-transitory computer readable (storage) medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

The above-described methods including portions thereof can be performed by software, hardware, and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The methods and systems, including components thereof, herein have been described with exemplary reference to specific hardware and software. The processes methods have been described as exemplary, whereby specific steps and their order can be omitted and/or changed by persons of ordinary skill in the art to reduce these embodiments to practice without undue experimentation. The methods and systems have been described in a manner sufficient to enable persons of ordinary skill in the art to readily adapt other hardware and software as may be needed to reduce any of the embodiments to practice without undue experimentation and using conventional techniques.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the disclosed subject matter has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method for evaluating threats in a cloud environment having a plurality of assets, the method comprising:
    for each pair of one or more pairs of the assets, obtaining one or more identified paths from a first asset of the pair to a second asset of the pair, each path of the one or more identified paths defined by a sequence of assets that includes the first and second assets; and
    for each path of the one or more identified paths, determining a likelihood that an attacker that is at the first asset will successfully reach the second asset via the path, wherein for each path of the one or more identified paths, determining the likelihood includes:
for each set of adjacent assets in the sequence of assets, determining a probability that the attacker will successfully advance from a current asset of the set to a next asset of the set, and
multiplying together the determined probabilities to determine an overall probability that the attacker will successfully advance from the first asset to the second asset.

2. The method of claim 1, further comprising:
for each pair of the one or more pairs, determining a risk score for the pair based on the determined likelihoods for the one or more identified paths, the risk score indicative of a risk of the attacker reaching the second asset from the first asset.

3. The method of claim 2, wherein determining the risk score for the pair includes summing the determined likelihoods of the one or more identified paths.

4. The method of claim 2, further comprising:
for each pair of the one or more pairs, assigning a protective measure to the pair in accordance with the risk score to mitigate risk of the attacker reaching the second asset from the first asset.

5. The method of claim 4, further comprising:
detecting a malicious attack at a first asset of one of the one or more pairs; and
applying to the cloud environment the protective measure assigned to the pair.

6. The method of claim 1, wherein determining the probability is performed using a set of rules and a large language model.

7. The method of claim 1, wherein determining the probability is based on a current security posture of the cloud environment and a current topology of the cloud environment.

8. The method of claim 1, wherein for each set of adjacent assets in the sequence of assets, the probability that the attacker will successfully advance from a current asset of the set to a next asset of the set is unity.

9. The method of claim 1, wherein for at least one set of adjacent assets in the sequence of assets, the probability that the attacker will successfully advance from a current asset of the set to a next asset of the set is less than one.

10. The method of claim 1, wherein the second asset is designated by the cloud environment as a critical asset to the cloud environment.

11. The method of claim 1, further comprising:
for a given pair of the one or more pairs, obtaining one or more identified attack paths to the second asset of the given pair, each identified attack path originating at a different asset; and
calculating a risk score indicative of a risk of the attacker reaching the second asset of the given pair from any one of the identified attack paths.

12. The method of claim 1, wherein the attacker is a simulation of a malicious attacker.

13. The method of claim 1, wherein for each path of the one or more identified paths, determining the likelihood is performed using a large language model (LLM).

14. The method of claim 13, wherein the LLM determines the likelihood based on a plurality of parameters including: parameters of the assets of each pair, and the topology of the cloud environment.

15. A method for evaluating threats in a cloud environment having a plurality of assets, wherein the plurality of assets includes at least one asset designated by the cloud environment as a critical asset to the cloud environment, the method comprising the steps of:
a) obtaining one or more identified paths from a source asset of the plurality of assets to a critical asset of the plurality of assets, each path of the one or more identified paths defined by a sequence of assets that includes the source asset and the critical asset; and
b) for each path of the one or more identified paths, determining a likelihood that an attacker that is at the source asset will successfully reach the critical asset via the path, wherein for each path of the one or more identified paths, determining the likelihood includes:
i) for each set of adjacent assets in the sequence of assets, determining a probability that the attacker will successfully advance from a current asset of the set to a next asset of the set, and
ii) multiplying together the determined probabilities to determine an overall probability that the attacker will successfully advance from the first asset to the second asset.

16. The method of claim 15, further comprising the step of:
c) determining a risk score associated with an asset pair, defined by the source asset and the critical asset, based on the determined likelihoods for the one or more identified paths, the risk score indicative of a risk of the attacker reaching the critical asset from the source asset.

17. The method of claim 16, wherein the plurality of assets includes a plurality of critical assets, the method further comprising the step of:
d) repeating step a) through c) for each critical asset of the plurality of critical assets.

18. The method of claim 15, wherein determining a likelihood that an attacker that is at the source asset will successfully reach the critical asset via the path is performed using a large language model (LLM).

19. A computer system for evaluating threats in a cloud environment having a plurality of assets, the computer system comprising:
a non-transitory storage medium that stores program code; and
a computerized processor configured to execute the program code to:
for each pair of one or more pairs of the assets, obtain one or more identified paths from a first asset of the pair to a second asset of the pair, each path of the one or more identified paths defined by a sequence of assets that includes the first and second assets, and
for each path of the one or more identified paths, determine a likelihood that an attacker that is at the first asset will successfully reach the second asset via the path, wherein for each path of the one or more identified paths, determining the likelihood includes:
for each set of adjacent assets in the sequence of assets, determining a probability that the attacker will successfully advance from a current asset of the set to a next asset of the set, and
multiplying together the determined probabilities to determine an overall probability that the attacker will successfully advance from the first asset to the second asset.

* * * * *